(12) United States Patent
Sapozhnykov et al.

(10) Patent No.: US 8,559,481 B2
(45) Date of Patent: Oct. 15, 2013

(54) METHOD AND AN APPARATUS FOR SYNCHRONISING A RECEIVER TIMING TO TRANSMITTER TIMING

(75) Inventors: Vitaliy Sapozhnykov, Victoria (AU); Magnus Nilsbo, Älta (SE); Scott Leyonhjelm, Victoria (AU)

(73) Assignee: Samsung Electronics Co., Ltd (KR)

( * ) Notice: Subject to any disclaimer, the term of this patent is extended or adjusted under 35 U.S.C. 154(b) by 914 days.

(21) Appl. No.: 12/451,935

(22) PCT Filed: Jun. 25, 2007

(86) PCT No.: PCT/SE2007/050466
§ 371 (c)(1),
(2), (4) Date: Dec. 8, 2009

(87) PCT Pub. No.: WO2009/002242
PCT Pub. Date: Dec. 31, 2008

(65) Prior Publication Data
US 2010/0135447 A1    Jun. 3, 2010

(51) Int. Cl.
*H04B 1/00* (2006.01)
(52) U.S. Cl.
USPC .......................................................... 375/146
(58) Field of Classification Search
USPC ........ 375/362, 343, 368; 382/236, 243, 384.1
See application file for complete search history.

(56) References Cited

U.S. PATENT DOCUMENTS

| 5,732,113 | A | 3/1998 | Schmidl et al. |
| 7,039,000 | B2 | 5/2006 | You et al. |
| 2003/0161428 | A1 | 8/2003 | Garrett et al. |
| 2005/0063297 | A1 | 3/2005 | Sakata et al. |
| 2005/0220230 | A1 | 10/2005 | Fukuda |
| 2007/0297645 | A1 * | 12/2007 | Pace ............................... 382/103 |
| 2008/0198931 | A1 | 8/2008 | Chappalli et al. |
| 2008/0198932 | A1 * | 8/2008 | Sei ............................ 375/240.16 |

FOREIGN PATENT DOCUMENTS

| JP | 11-088455 | 3/1999 |
| JP | 2000-278242 | 10/2000 |
| JP | 2002-118542 | 4/2002 |
| JP | 2005-064567 | 3/2005 |
| JP | 2005-295085 | 10/2005 |
| JP | 2006-173764 | 6/2006 |

* cited by examiner

*Primary Examiner* — Khai Tran
(74) *Attorney, Agent, or Firm* — The Farrell Law Firm, P.C.

(57) ABSTRACT

The present application relates to a method and an apparatus for synchronizing a receiver timing to a transmitter timing using a known preamble of a signal. In at least one embodiment of the method and/or the apparatus of the present application, a power normalized cross-correlation metric (PNCC metric) is estimated based on a signal power and a noise floor power. According to a first embodiment, two cross-correlation functions, one based on the PNCC metric and the other based on a cross-correlation metric, are used to decide if synchronization events occur and based on the analysis of time indexes and PNCC magnitude values, a timing synchronization index used to synchronize receiver timing to transmitter timing is determined. According to a second embodiment, the cross-correlation function based on the PNCC metric is used to decide if synchronization events occur and based on an analysis of time indexes and PNCC magnitude values using a clustering approach, a timing synchronization index is determined.

16 Claims, 10 Drawing Sheets

METHOD AND AN APPARATUS FOR SYNCHRONISING A RECEIVER TIMING TO TRANSMITTER TIMING

TECHNICAL FIELD OF THE INVENTION

The present invention relates generally to the field of digital communication systems, and more particularly to a method and an apparatus for synchronising a receiver timing to transmitter timing.

BACKGROUND OF THE INVENTION

In digital and analogue communication systems such as wired, wireless and optical communication systems, receiver timing and transmitter timing must be properly synchronised in order for the receiver to correctly demodulate received signals. The degree of sensitivity to synchronisation varies between the different communications systems. An example of a communication system that is known to be sensitive to imprecise synchronisation is the orthogonal frequency division multiplexing (OFDM) based system.

OFDM is a signal modulation technique that enables efficient transmission of data over wireless or wired communication channels. This technique employs a concept of subcarrier frequencies in which the data being communicated over the channel is encoded into amplitude/phase relations of the subcarriers which are spaced apart by constant frequency differences.

OFDM has several advantages over conventional data communication methods. One advantage is high spectral efficiency. In OFDM, the subcarriers are mutually orthogonal so no frequency guard band between them is required and almost the whole bandwidth is dedicated to the data transmission. Another advantage is robustness against inter symbol interference (ISI). A so called guard time between OFDM symbols is used to eliminate ISI. In OFDM, a cyclic prefix, which is a copy of the last portion of the symbol appended to the front of itself or a copy of the symbol is appended to the back of itself, is usually transmitted prior to the OFDM symbol. The time guard interval is typically chosen to be longer than the longest channel delay spread. Yet another advantage is tolerance to frequency selective fading. If the number of sub-carrier frequency is chosen to be sufficiently large, the fading caused by multipath propagation can be considered to be flat for every sub-carrier frequency. This simplifies the equalisation process.

Although OFDM possesses these advantages, it also has some disadvantages. Amongst the most important ones is, as mentioned above, sensitivity to imprecise synchronisation.

If for example, the timing synchronisation in OFDM systems is not achieved it is not possible to remove the cyclic prefix at the correct time instances and, as a consequence, the fast Fourier transform (FFT) demodulator is supplied with incorrect OFDM symbols.

In the prior art, a number of solutions are known for timing synchronisation.

In the method described in the U.S. Pat. No. 7,039,000, a coarse index used to adjust an unsynchronised received OFDM signal is determined by correlating a first half of a training symbol sequence of the OFDM signal with a second half of the training symbol sequence, whereby a first correlation function is determined. This first correlation function is compared with a predetermined threshold to determine the coarse index (or coarse timing estimate). Then, in the coarsely adjusted OFDM signal, the first training symbol is correlated with the last training symbol giving rise to a second correlation function. The second correlation function is further compared with another predetermined threshold to determine a fine index. The fine index is used to adjust the coarsely adjusted OFDM signal so that the receiver is synchronised with the transmitted OFDM signal.

In the method described in the U.S. Pat. No. 5,732,113, two unique training symbols are used to achieve timing and frequency synchronisation. The unique training symbol halves are identical in time order by transmitting a pseudo-random (PN) sequence on the even frequencies, while zeros are utilized on the odd frequencies. The time synchronisation process relies on autocorrelation of the first training symbol (a criterion function). Then, it determines the timing estimate by comparing the criterion function with a predetermined threshold. For achieving frequency synchronisation, a second autocorrelation of the second training symbol is used.

A drawback with the methods described in the prior art described above is that these methods rely on simple criterion functions and/or correlation functions which can be auto- or crosscorrelation or both and that the synchronisation is deemed to occur where the criterion functions exceeds some predetermined threshold (or thresholds). This leads to increased uncertainty in timing estimation and reduces accuracy of the synchronisation because the location of a peak or peaks of the criterion function(s) may vary significantly due to the delay spread of the channel.

Another drawback with the prior art solutions described above concerns the possibility that criterion functions exceed the threshold(s) too early so that false synchronisations occur (false alarm). This is especially the case when the quality of the received signal is bad due to high noise level and severe multipath conditions. As a consequence the whole OFDM signal may be rejected by the receiver since the timing estimation is incorrect.

SUMMARY OF THE INVENTION

The present invention addresses the needs above as well as other needs by providing a method and an apparatus for synchronising a receiver timing to transmitter timing.

According to a first aspect of the present invention, the above stated problem is solved by means of a method for synchronising a receiver timing to transmitter timing using a known preamble of a signal. The preamble comprises at least one training sequence. According to the method of the present invention, an absolute value of a crosscorrelation metric is estimated based on input samples of the signal and samples of a training sequence of the preamble. A short-term average of the estimated absolute value of the crosscorrelation metric is further used to estimate a signal power, and a delayed long-term average of the absolute value of the crosscorrelation metric is used to estimate a noise floor power. Thereafter a power normalized crosscorrelation (PNCC) metric is estimated as a function of the estimated power signal and the estimated noise floor power. According to the method of the present invention, the PNCC metric is further used to decide if at least one time synchronisation event occurs. The decision is based on at least one first synchronisation criterion being satisfied. The synchronisation criterion corresponds to the PNCC metric exceeding a predetermined threshold. For each time a synchronisation event occurs, a magnitude value of the PNCC metric and a corresponding time index are stored. The stored magnitude values of the PNCC metric and corresponding time indexes are further analysed to synchronise timing in the receiver to timing in the transmitter using a timing synchronisation index that is based on at least one stored time index.

According to a second aspect of the present invention, the above stated problem is solved by means of an apparatus for synchronising a receiver timing to a transmitter timing using a known preamble of a signal. The preamble comprises at least one training sequence. According to the present invention the apparatus comprises: a crosscorrelator that is configured to estimate an absolute value of a crosscorrelation metric based on input samples of the signal and samples of a training sequence of said preamble; a signal power estimator that is configured to estimate a signal power using a short-term average of the estimated absolute value of the crosscorrelation metric; a noise floor power estimator that is configured to estimate a noise floor power using a delayed long-term average of the estimated absolute value of the crosscorrelation metric; means for estimating a power normalized crosscorrelation metric (PNCC metric) as a function of the estimated signal power and the estimated noise floor power; decision means that is configured to decide that at least one time synchronisation event occurs when at least one first synchronisation criterion is satisfied corresponding to the PNCC metric exceeding a threshold value and further configured to store, for each time a synchronisation event occurs, a magnitude value of the PNCC metric and a corresponding time index; and analysing means that is configured to analyse the stored time indexes and corresponding magnitude values of the PNCC metric in order to synchronise timing in the receiver to timing in the transmitter using a timing synchronisation index that is based on at least one stored time index.

In the present invention, because the timing synchronisation method and apparatus use at least one first criterion function to decide when time synchronisation events occur and further analyse time index/indexes and corresponding magnitude values of an estimated power normalised crosscorrelation metric to derive a timing synchronisation index, the synchronisation accuracy is improved and the probability of false alarm is reduced.

The present invention will now be described in more detail by means of preferred embodiments and with reference to the accompanying drawings, attention to be called to the fact, however, that the following drawings are illustrative only, and that changes may be made in the specific embodiments illustrated and described within the scope of the appended claims.

DETAILED DESCRIPTION OF THE INVENTION

The invention is described in a general context in relation to multicarrier communication systems such as OFDM (Orthogonal Frequency Division Multiplexing) based systems for communicating data. By way of example, the present invention may be applied to WLAN (Wireless Local Area Network) systems, IEEE 802.11 (Institute of Electrical and Electronics Engineers) systems WiFi (Wireless Fidelity), WiMAX (Worldwide Interoperability for Microwave Access) systems, ADSL (Asymmetric Digital Subscriber Line) systems, LTE system or any other system that is based on OFDM. The present invention may also be applied to single carrier systems such as single carrier frequency division multiple access (SC-FDMA) system.

Figure 1:
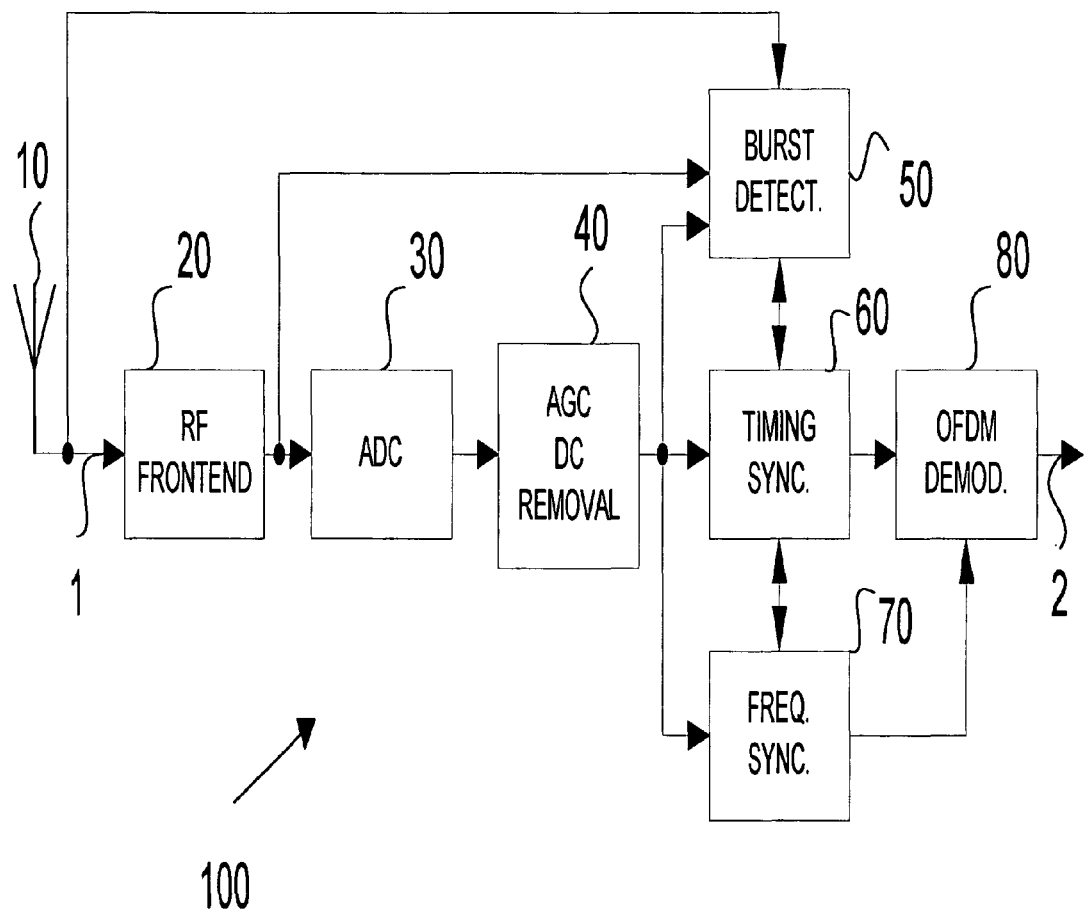
FIG. 1 is a block diagram illustrating an example of a general OFDM receiver model in which the present invention may be used.

FIG. 1 illustrates block diagram of a general OFDM receiver model 100 in which the present invention may be used. A receiver antenna 10 upon receiving an OFDM modulated signal 1 feeds a radio frequency (RF) front end 20 where the OFDM signal 1 is filtered and amplified prior to send it to an analogue to digital converter (ADC) 30. The RF front end 20 may perform Analogue gain control and DC removal. After the analogue to digital conversion the sampled and quantized received signal is further enhanced by a digital automatic gain control (AGC) block 40 to further adjust the signal level and a direct current (DC) offset removal algorithm to remove the constant DC component from the received samples. The signal is then passed to a burst detector 50 which detects the presence of a frame (or burst) in the received OFDM signal 1. The presence of a frame in the received OFDM signal 1 detected by the burst detector 50 may be based on, for example, the short training sequence of e.g. a WLAN IEEE 802.11 OFDM signal or may be based on any repeating training preamble such as in a WiMax OFDM signal or in a ADSL OFDM signal. As illustrated in FIG. 1, the burst detector 50 is connected to a timing synchroniser 60. The timing synchroniser 60 is typically enabled by a successful burst energy (or burst) detection event from the burst detector 50 so that the time synchronisation process can be accomplished along with a frequency synchronisation, performed by a frequency synchroniser 70, prior to commencing an OFDM demodulation by an OFDM demodulator 80 which thus generates an OFDM demodulated signal 2. It should be noted that the burst detection function can be implemented in the analogue domain or in the digital domain using signal(s) derived from the antenna, analog receiver chain prior to the ADC 30 or a digital signal taken after the ADC 30 and that the burst detector 50 may be integrated into the timing synchroniser 60. According to embodiments of the present invention, the timing synchronisation process may be based on the reception of a signal which comprises a preamble that includes at least one training sequence (or repeated training symbols).

Figure 2:
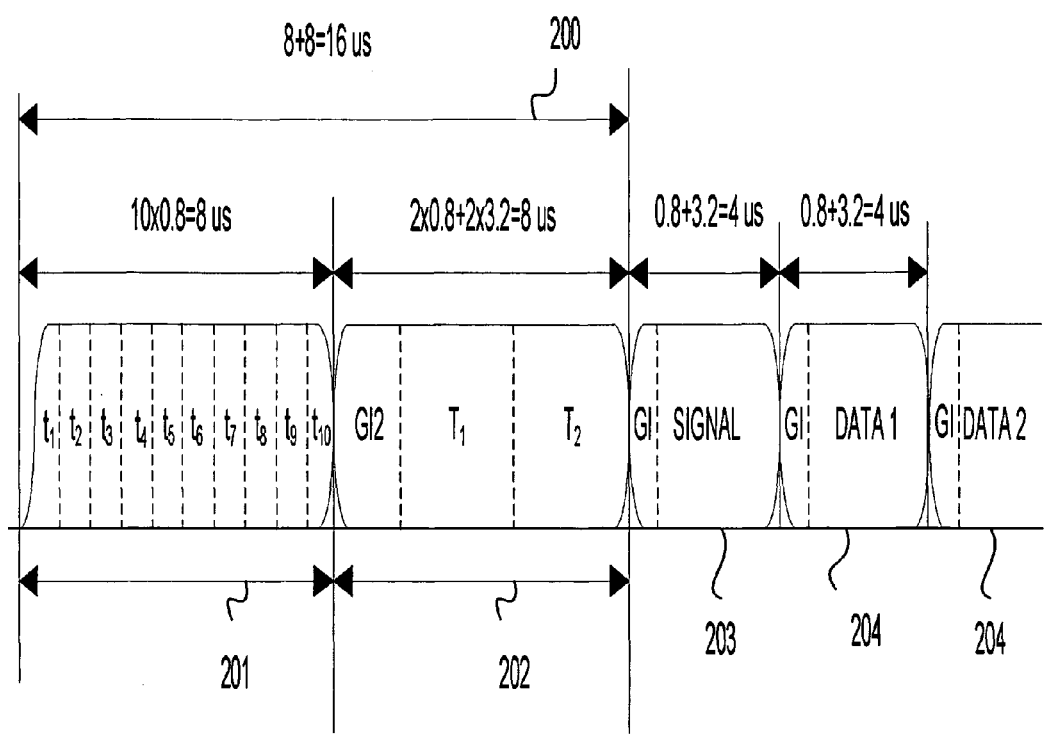
FIG. 2 illustrates an exemplary timing diagram of an OFDM signal including a preamble field, that that maybe used by the present invention.

FIG. 2 illustrates a preamble field 200 of a WLAN IEEE 802.11a/g frame structure, that maybe used for synchronisation purposes in accordance with exemplary embodiments of the present invention. It should be noted that the present invention is not restricted to a WLAN system.

As illustrated in FIG. 2, the preamble field 200 includes field 201 comprised of ten short training symbols. This field 201 is also referred to as a short training sequence 201. The preamble field 200 also includes two long training symbols 202 pre-appended with a guard interval GI2. This field 202 is also referred to as a long training sequence 202. The preamble field 200 is followed by a signal field 203 and multiple data fields 204. The total length of the preamble field 200 is 16 μs. The vertical dashed boundaries in FIG. 2 denote repetitions due to the periodicity of the inverse (discrete) fast Fourier transform.

Although the synchronisation method and apparatus according to exemplary embodiments of the present invention will hereinafter be described with reference to an OFDM based system, it should be understood that the method and apparatus can also be applied to system that uses any preamble structure with repeated training sequences or repeated training symbols.

As mentioned above, time synchronisation is typically enabled by a successful burst detection event from the burst detector 50. Thus; the synchronisation is switched on by the burst detector 50 and switched off when either both the synchronisation has been achieved and the long training sequence has expired (i.e. a certain number of samples have passed since the burst detection event), or when no synchronisation has occurred for a given time period. In the latter case, the timing synchroniser 60 flags "time-out" event and resets itself to the initial state. The "time-out" event may then restart the burst detector 50 and the whole process of burst detection/timing synchronisation is repeated until synchronisation is achieved. Note that short training sequence may, instead of the long training sequence, also be used above.

Figure 3:
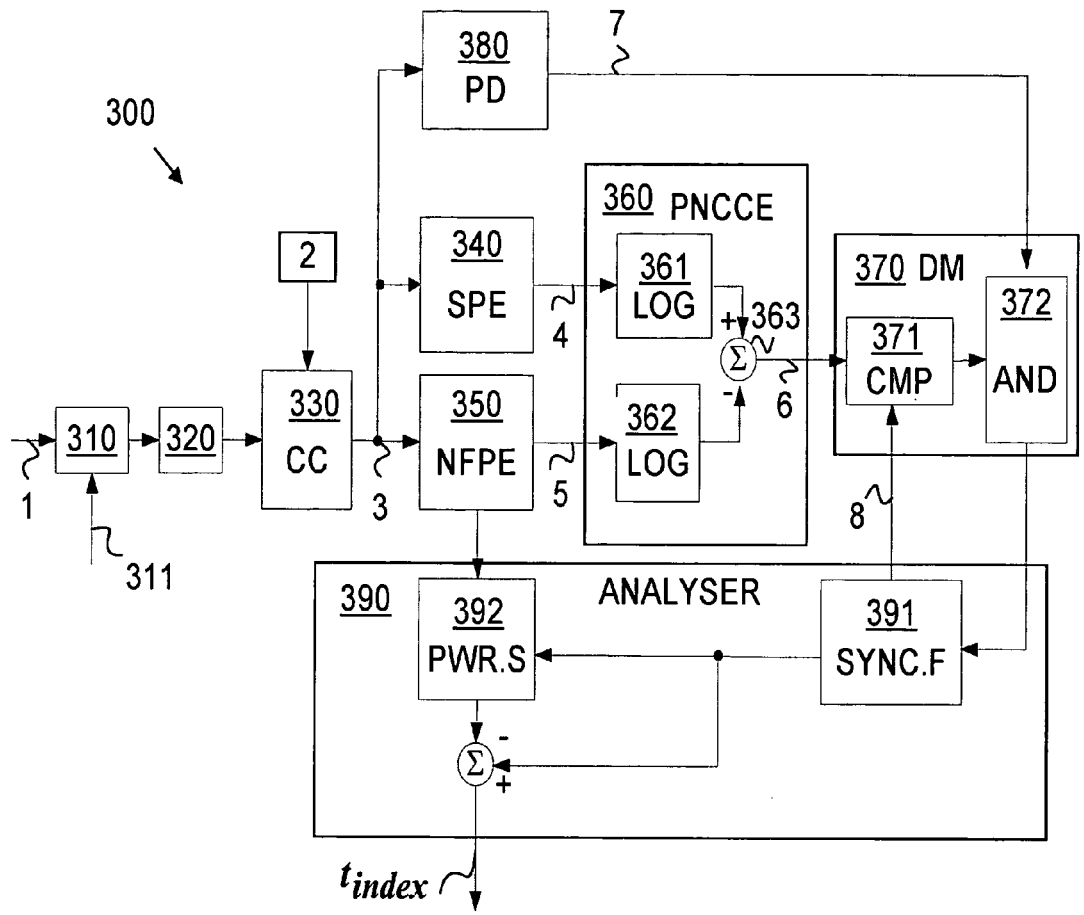
FIG. 3 illustrates a block diagram of an apparatus in accordance with a first exemplary embodiment of the present invention.

FIG. 3 shows a block diagram of an apparatus 300 in accordance with a first exemplary embodiment of the present invention, for synchronising a receiver (not shown) timing to a transmitter (not shown) timing using a known preamble 2 of a received signal 1. As illustrated, the apparatus 300 comprises a crosscorrelator 330 (CC) that is configured to estimate an absolute value of a crosscorrelation metric 3, denoted |C(i)|, based on coarse frequency adjusted and quantized input samples x(i) of the received signal 1. The input samples x(i) are, according to this first embodiment, coarse frequency adjusted in block 310 with a coarse frequency estimate value 311, and quantized to n-bit numbers in block 320. The crosscorrelator 330 (CC) crosscorrelates the coarse frequency adjusted and quantized input samples x(i) with complex conjugated quantized samples y(j) of a training sequence of the preamble 2 which may be a priori known to apparatus 300. According to the present invention, the preamble is quantized to m-bits, i and j are time indexes. It should be noted that the quantization operation is performed to reduce complexity.

According to an exemplary embodiment of the present invention, the crosscorrelation metric may e.g. be estimated based on the first period of the preamble's long training sequence including the guard interval, although the guard interval may be omitted. According to another exemplary embodiment of the present invention, the crosscorrelation metric may be estimated based on the input signal 1 and any predefined training preamble 2 quantized to m-bit numbers.

According to exemplary embodiments of the present invention the absolute value of the crosscorrelation metric |C(i)| is thus given by the following expression:

$$|C(i)| = \left| \sum_{j=0}^{L-1} y^*(j) x(i+j) \right|, \quad (1)$$

wherein C(i) is as mentioned above the estimated crosscorrelation metric, x(i+j) are input samples of the signal 1 that are coarse frequency adjusted and quantized to n-bit; y(j) are samples of the training sequence of the preamble 2 quantized to m-bit; $0 < L \leq N_T$; where $N_T$ is the length of the preamble; * is the complex conjugation operator; |.| is the absolute value operator and i=0, 1, . . . and j=0, . . . , L−1 are time indexes.

Referring back to FIG. 3, the output 3 of the crosscorrelator 330 (CC) i.e. the absolute value of the crosscorrelation metric |C(i)| is further used to estimate a signal power 4 in a signal power estimator 340 (SPE). The signal power estimator 340 estimates the signal power 4 using a short-term average (or moving average) on the output of the crosscorrelator 330 (CC). The estimate of the signal power 4, denoted below $P_S(i)$ is given by the following expression:

$$P_S(i) = MA_S(i) = \frac{1}{N_S} \sum_{j=0}^{N_S-1} |C(j+i)|, \quad (2)$$

wherein $MA_S$ is the short-term average or short-term moving average of the absolute value of the crosscorrelation metric |C(i)|, $N_S$ is the term of the average; i=0, 1, . . . and j=0, 1, . . . , $N_S$−1 are time indexes.

According to embodiments of the present invention, apparatus 300 further comprises a noise floor power estimator 350 (NFPE) that receives as input the output 3 of the crosscorrelator 330 (CC) (i.e. |C(i)|) and estimates a noise floor power 5 using a delayed long-term average (or moving average) on the output 3 of the crosscorrelator 330 (CC) (i.e. on |C(i)|). The estimate of the noise floor power 5, denoted below $P_{NF}(i)$ is given by the following expression:

$$P_{NF}(i) = MA_L(i+D) = \frac{1}{N_L} \sum_{j=0}^{N_L-1} |C(j+i+D)|, \quad (3)$$

wherein $MA_L$ is the long-term average (or moving average) of the absolute value of the crosscorrelation metric |C(i)| that is delayed with a delay D to align at least one peak of the short-term average (or signal power 4) with the floor of the long-term average (or noise floor power 5); $N_L$ is the long term of the average; i=0, 1, . . . and j=0, 1, . . . , $N_L$−1 are time indexes. The noise floor power estimator 350 uses, according to embodiments of the present invention, a greater term $N_L$ of the average than the term $N_S$ of the average (see equation 2) used to estimate the signal power 4.

As illustrated in FIG. 3, apparatus 300 further comprises, in accordance with embodiments of the present invention, means 360 for estimating a power normalised crosscorrelation metric (PNCC metric) 6 as a function of the estimated signal power 4 and the noise floor power 5. Means 360, referred in FIG. 3 as PNCCE (short for PNCC estimator) thus receives as inputs the estimate of a signal power ($P_S(i)$) 4 and the estimate of a noise floor power $P_{NF}(i)$) 5 and generates an estimate of a power normalised crosscorrelation metric (PNCC metric) 6.

According to an embodiment of the present invention, the PNCC metric 6, which according to the present invention is level insensitive due to the power normalisation, is estimated as a difference between two logarithmic metrics: log-signal power and log-noise floor power. Therefore, in accordance with this embodiment, means 360 comprises means 361 (LOG) for converting the signal power 4 into logarithmic form and means 362 (LOG) for converting the noise floor power 5 into logarithmic form. Means 360 (PNCCE) further comprises a combiner 363 that outputs the PNCC metric 6 as a difference between log-signal power and log-noise floor power. According to an embodiment of the present invention the PNCC metric 6 is estimated using the following expression:

$$\text{PNCC}(i) = \log(P_S(i)) - \log(P_{NF}(i)) \quad (4)$$

where as mentioned above, $P_S$ is the estimated signal power 4; $P_{NF}$ is the estimated noise floor power 5 and log is a logarithm function of any base.

According to another embodiment of the present invention, the PNCC metric 6 may be estimated by dividing the signal power ($P_S(i)$) 4 with the noise floor power ($P_{NF}(i)$) 5 according to the following expression:

$$PNCC(i) = \frac{P_S(i)}{P_{NF}(i)} \quad (5)$$

As shown in FIG. 3, apparatus 300 further comprises decision means 370 that is configured to decide that at least one time synchronisation event occurs when at least one first synchronisation criterion CF1 is satisfied. The first synchronisation criterion CF1 corresponds to the PNCC metric 6 exceeding a threshold value 8. Therefore, decision means 370 may comprise, as illustrated in FIG. 3, a comparator 371 (CMP) that receives the estimate of the PNCC metric 6 where it is compared with the threshold value 8. In case the PNCC metric 6 is estimated using equation 4 then the threshold value 8 is a logarithmic metric which may be chosen empirically based on e.g. Monte-Carlo simulations over a range of signal to noise ratios and communication channels. Note that when equation 5 is instead used to estimate the PNCC metric 6 then the threshold value 8 may be chosen based on channel simulations based on e.g. Monte-Carlo simulations. However, in the latter case, the threshold value 8 is not in logarithmic form.

Thus, the decision means 370 decides that the first synchronisation criterion CF1 is satisfied when the PNCC metric 6 exceeds threshold value 8 upon comparing in the comparator 371 (CMP) the estimate of the PNCC metric 6 with the threshold value 8.

As shown in FIG. 3 and according to this first exemplary embodiment of the present invention, apparatus 300 further comprises a peak detector 380 (PD) that is configured to receive as input the absolute value of the crosscorrelation metric 3 (or |C(i)| and to detect when |C(i)| exhibits a peak 7 within a predetermined or given time window. In other words |C(i)| is searched for its maximum within a predetermined window of $N_p$ sample intervals. According to this first exemplary embodiment, a peak is considered to be a sample which is greater than one or more adjacent samples on either side of it. In case peak detector 380 (PD) detects a peak within $N_p$ instances of |C(i)| where i=0, 1, . . . $N_p$−1, then according to this first embodiment of the present invention, a second criterion function CF2 (corresponding to |C(i)| exhibiting a peak) is declared satisfied.

According to this first embodiment of the present invention, decision means 370 further comprises an AND block 372 that is configured to declare that a time synchronisation event occurs only when both the first criterion function CF1 and the second criterion function CF2 are satisfied. Again, the first criterion function CF1 is considered satisfied when the PNCC metric 6 exceeds the threshold value 8 and the second criterion function CF2 is considered satisfied when a peak is detected. The AND block 372 outputs "true" or "Sync Event" if both CF1 and CF2 are satisfied, that is when the peak detector 380 (PD) outputs "true" and at the same the comparator 371 (CMP) outputs "true" then the AND block 372 outputs "true" or "Sync Event".

Figure 4A:
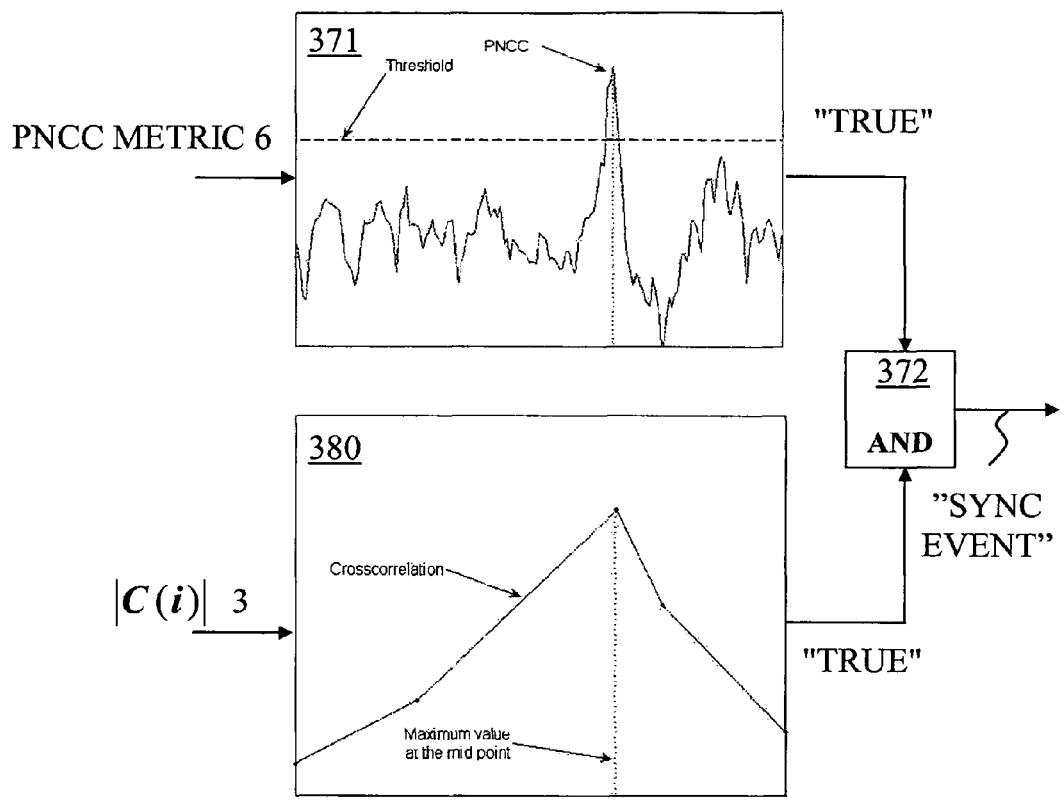
FIG. 4A illustrates an exemplary scenario where a time synchronisation event occurs in an apparatus according to the first exemplary embodiment of the present invention.

FIG. 4A illustrates an exemplary scenario where a time synchronisation event occurs. As illustrated, the comparator 371 (CMP) compares the PNCC metric 6 with a threshold whereas the peak detector 380 (PD) searches for a maximum value (or peak) of the absolute value of the crosscorrelation metric |C(i)| (or similarly output 3 from the crosscorrelator 330 (CC)).

According to this first exemplary embodiment of the present invention, each time a synchronisation event occurs a magnitude value of the PNCC metric 6 where the threshold is exceeded and a corresponding time index or timing point are stored in memory of the decision means 370. Thus, the synchronisation process does not stop immediately after the first "sync event" occurs but continues on until the training sequence has expired or a time out has occurred. This is to minimize the probability of false alarm. It should be noted that in case a false alarm occurs, apparatus 300 according to the first embodiment of the present invention continues the search for the actual synchronisation point or a timing synchronisation index until the preamble 2 is known to expire.

According to this first embodiment of the present invention, a stored magnitude value of the PNCC metric 6 and a corresponding time index are further fed from comparator 371 (CMP) to a synchronisation filter 391 (SYNC.F) of analysing means 390 (ANALYSER), also denoted here as a post-processor. The analysing means 390 (ANALYSER) is configured to analyse stored time indexes and corresponding magnitude values of the PNCC metric 6 in order to synchronise timing using a timing synchronisation index that is based on stored time index/indexes.

According to this first embodiment of the present invention, the synchronisation filter 391 (SYNC.F) upon receiving a timing index and a corresponding PNCC magnitude value satisfying the synchronisation criteria, adjusts the threshold value 8 to the magnitude value of the PNCC metric 6 corresponding to the synchronisation point (i.e. the point where a "Sync Event" is declared). Thus, subsequent synchronisation events must now, according to this first embodiment of the present invention, meet a higher threshold value 8 (denoted PNCC threshold value) to satisfy the synchronisation criteria. This is performed to avoid locking on spurious crosscorrelation peaks and therefore to increase synchronisation accuracy and decrease the false alarm probability. Thus in accordance with the first embodiment of the present invention, the PNCC threshold value is updated each time a synchronisation event occurs or each time decision means 370 decides that a "Sync Event" occurs.

According to the first embodiment of the present invention, the synchronisation filter 391 (SYNC.F) is further configured to increase, until the training sequence expires, the PNCC threshold value 8 by a predetermined number multiple of its current value (e.g. by 50%) after a predetermined number of samples (e.g. 16 samples) have elapsed since the last time a synchronisation event occurred. It should be noted that the predetermined number of samples and the percentage value used to increase the PNCC threshold value 8 are a design choice and therefore the present invention is not restricted to the above given values.

Figure 4B:
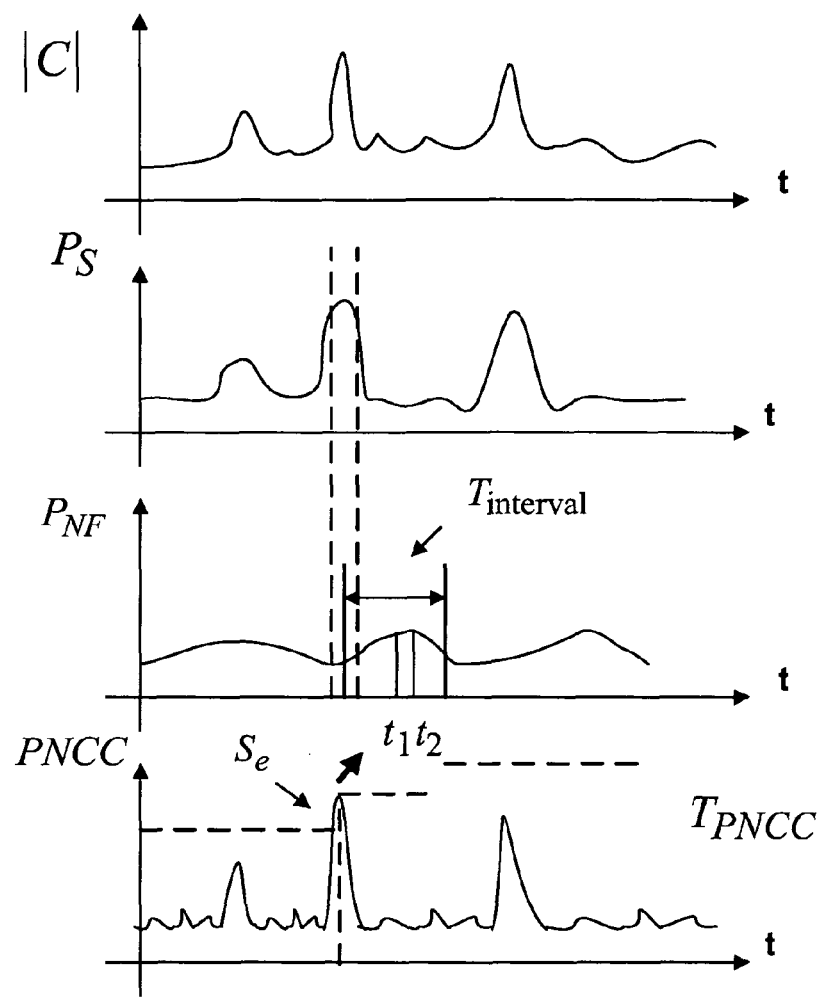
FIG. 4B is a graph illustrating an exemplary procedure performed by a power synchroniser of an apparatus according to the first exemplary embodiment of the present invention.

Referring back to FIG. 3 and according to the first embodiment of the present invention, analysing means 390 (ANALYSER) further comprises a power synchroniser 392 (PWR.S) which is connected to the noise floor power estimator 350 (NFPE) in order to determine a timing point offset in a time interval of the long-term averaged (or moving average) of the estimated absolute crosscorrelation metric $|C(i)|$. The timing point chosen represents a 'offset' timing value in an interval (e.g. 0 to 15) which attempts to maximise the signal energy of the OFDM symbol that is to be demodulated. The process performed by the power synchroniser 392 (PWR.S) to find this timing point offset ($t_1$ or $t_2$) is, according to this first embodiment of the present invention, described below. The process of finding a timing point offset ($t_1$ or $t_2$) is better understood using the process steps described below in conjunction with FIG. 4B.

1—find a point $S_e$ where a synchronisation event ("Sync Event") occurs based on the information received from the synchronisation filter 391 (SYNC.F) concerning the PNCC threshold value $T_{PNCC}$;

2—determine the beginning of a time interval $T_{interval}$ of the long-term averaged $P_{NF}$ of the estimated absolute crosscorrelation metric $|C(i)|$ corresponding to the "Sync Event". The length of the time interval $T_{interval}$ may for example be predetermined (e.g. 16 samples) and the beginning $T_{interval}$ is determined based on the output of the synchronisation filter 391 (SYNC.F) (the output of 391 being used as input to 392) which is the time index corresponding to the "Sync Event";

3a—determine a timing point offset $t_1$ as the mid-point of this time interval $T_{interval}$.

or

3b—determine a timing point offset $t_2$ in this time interval $T_{interval}$ where maximum of $P_{NF}$ occurs.

According to this first embodiment of the present invention, the timing point offset ($t_1$ or $t_2$) determined using the process described above, is used to determine a timing synchronisation index $t_{index}$ that is further used to synchronise the receiver timing to a transmitter timing.

The timing synchronisation index $t_{index}$ may, according to this first exemplary embodiment of the present invention, be calculated by taking the difference between the timing point offset ($t_1$ or $t_2$) and the last time index that is stored in the synchronisation filter 391 (SYNC.F) i.e.

$$t_{index} = \text{timing point offset} - \text{last time index} \quad (6)$$

where timing point offset is $t_1$ or $t_2$ and the last time index is the time index last stored in the synchronisation filter 391.

When the timing synchronisation index is determined, the beginning of the training sequence or the data of signal 1 is determined in order for the OFDM demodulator to correctly demodulate the received signal.

Figure 5:
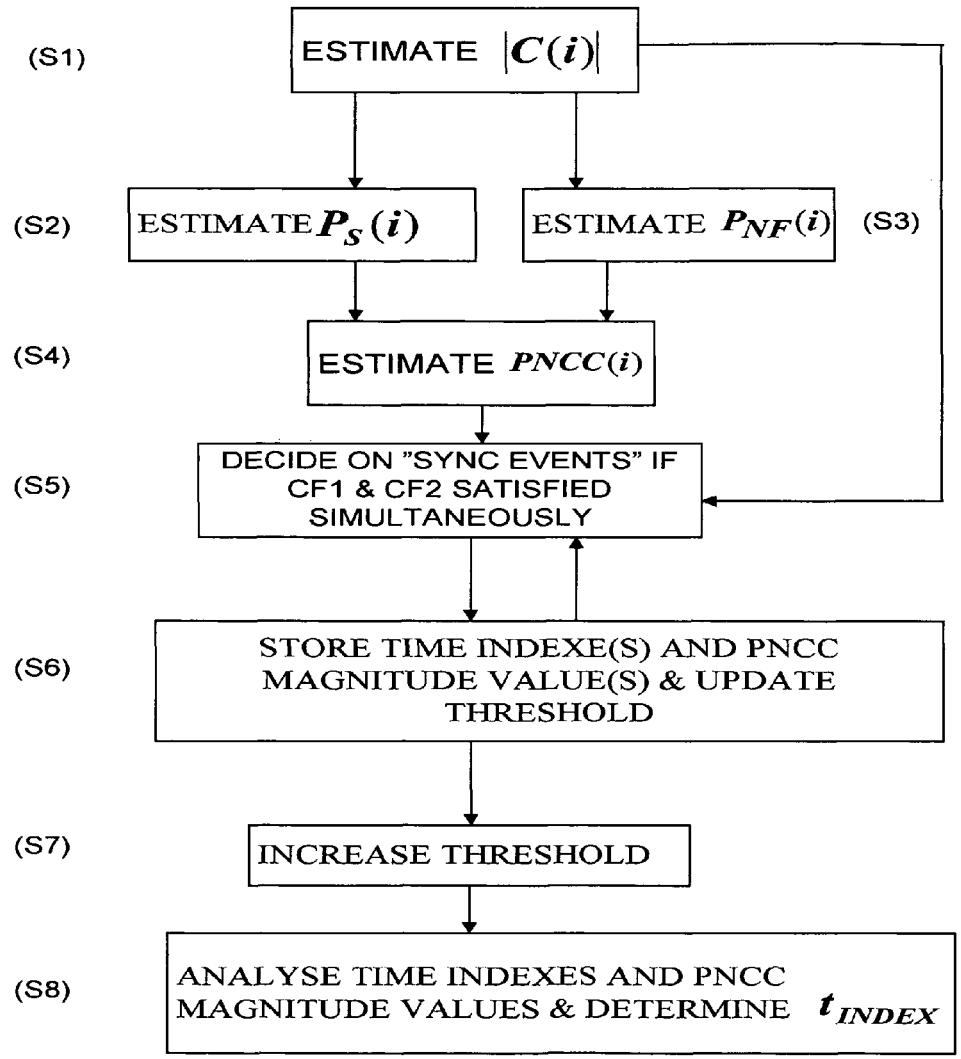
FIG. 5 is a flowchart of a method in accordance with the first exemplary embodiment of the present invention.

Referring to FIG. 5 there is illustrates a flowchart of a method in accordance with the above described first embodiment of the present invention, for synchronising a receiver timing to a transmitter timing using a known preamble of a signal 1, said preamble comprises at least one training sequence as previously described. The method comprising the steps of:

(S1) estimating an absolute value of a crosscorrelation metric $|C(i)|$ based on input samples of the signal (1) and samples of the training sequence of the preamble. $|C(i)|$ is given by equation (1) presented earlier;

(S2) estimating a signal power $P_S(i)$ using a short-term average (or moving average) of $|C(i)|$. $P_S(i)$ is given by equation (2) presented earlier;

(S3) estimating a noise floor power $P_{NF}(i)$ using a delayed long-term average (or moving average) of $|C(i)|$. $P_{NF}(i)$ is given by equation (3) presented earlier;

(S4) estimating a power normalized crosscorrelation metric PNCC(i) as a function of $P_S(i)$ $P_{NF}(i)$. PNCC(i) is given by equation (4) or equation (5) as presented earlier;

(S5) deciding, until the training sequence expires, that at least one synchronisation event "Sync Event" occurs when a first crosscorrelation metric CF1 and a second crosscorrelation metric CF2 are satisfied simultaneously wherein the CF1 is satisfied when the PNCC(i) exceeds a predetermined threshold level and wherein CF2 is satisfied when $|C(i)|$ exhibits a peak within a given time window;

(S6) store each time a "Sync Event" occurs, a magnitude value of PNCC(i) and a corresponding time index and update the threshold value with the magnitude value of PNCC(i) each time it is decided that a "Sync Event" occurs;

(S7) increase the threshold by a predetermined multiple of its current value if a predefined or predetermined number of samples have elapsed since the last "Sync Event" has occurred;

(S8) analyse stored time indexes and corresponding magnitude values of the PNCC metric to synchronise timing in the receiver to timing in the transmitter, using a timing synchronisation index $t_{index}$ that is based on a stored time index and on a timing point offset ($t_1$ or $t_2$) in a time interval of $P_{NF}(i)$ corresponding to the updated threshold value. According to an embodiment of the present invention, a timing point offset $t_1$ may be determined as the mid-point of the time interval. According to another embodiment of the present invention, a timing point offset $t_2$ may be determined where a maximum energy occurs in the time interval.

As described earlier, $|C(i)|$ is estimated using coarse frequency adjusted input signal samples quantized to a predefined number of n bits and cyclic extended first period of the training sequence samples quantized to a predefined number m of bits. According to an embodiment of the present invention the crosscorrelation metric $|C(i)|$ may e.g. be estimated based on the first period of the preamble's long training sequence, although it can be extended to include the guard interval. According to another exemplary embodiment of the present invention, the crosscorrelation metric $|C(i)|$ may be estimated based on the input signal 1 and any predefined training preamble quantized to m-bit numbers.

It should be noted that the quantization of the input signal samples and the quantization of the training preamble are performed in order to decrease the computational complexity.

According to the present invention, the apparatus 300 and the method described above in accordance with the first embodiment of the present invention may be implemented in e.g. a single input single output (SISO) communication antenna system that is based on OFDM or on a single carrier communication system that uses predefined preambles. Thus the present invention is not restricted to an OFDM based system. In addition, apparatus 300 may also be implemented in a multiple input multiple output (MIMO) communication antenna system comprised of N antennas (ANT 1, ANT 2, . . . , ANT N). However in case apparatus 300 is implemented in a MIMO system, N parallel apparatuses 300 may be used, one apparatus 300 per antenna.

Hereinafter and in accordance with FIG. 6, an apparatus 400 for synchronising a receiver (not shown) timing to a transmitter (not shown) timing using a known preamble 2 of a received signal 1 is described in accordance with a second embodiment of the present invention.

Figure 6:
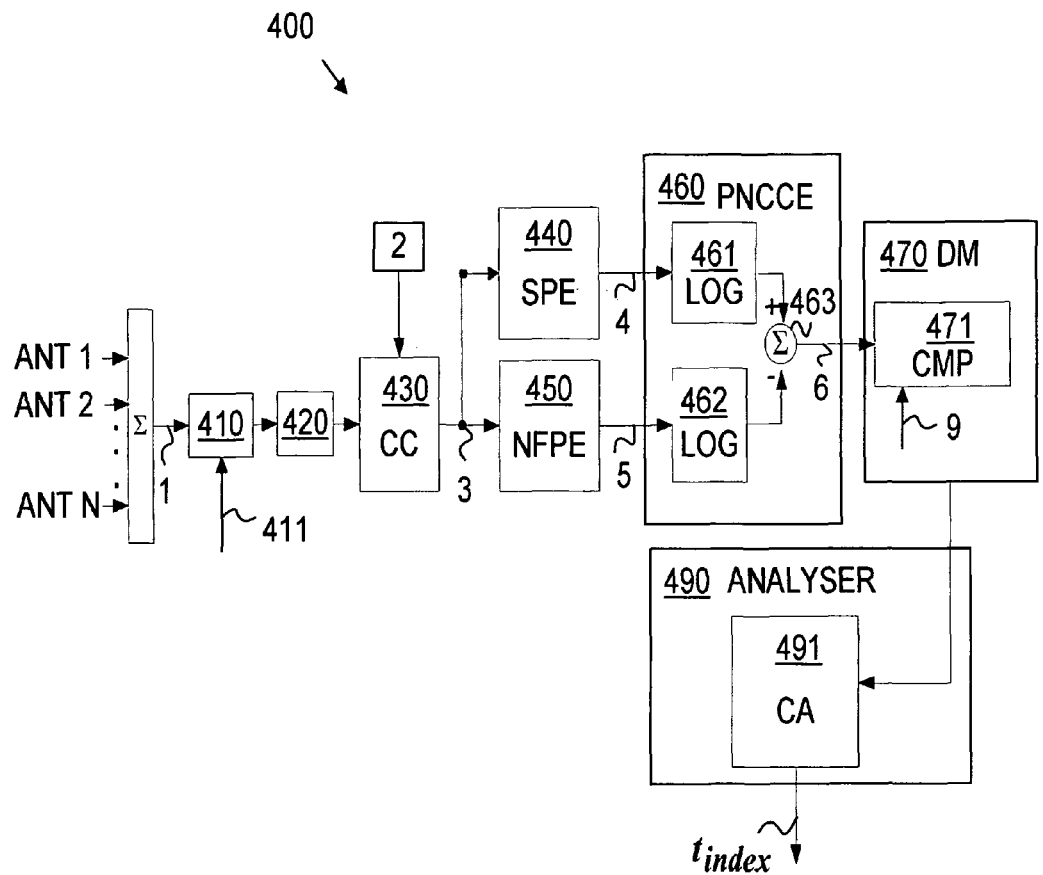
FIG. 6 illustrates a block diagram of an apparatus in accordance with a second exemplary embodiment of the present invention.

As illustrated in FIG. 6, apparatus 400 is in accordance with the present embodiment, suitable for use in a single input single output (SISO) communication antenna system or for use in a multiple input multiple output (MIMO) communication antenna system (indicated in FIG. 6 by ANT 1, ANT 2, . . . , ANT N).

According to this second embodiment of the present invention, apparatus 400 comprises, similarly to the previously described apparatus 300, a crosscorrelator 430 (CC) that is configured to estimate an absolute value of a crosscorrelation metric 3 |C(i)|, based on input samples x(j) of a received signal 1.

It should be noted that in case apparatus 400 is implemented in a MIMO antenna system, signal 1 that may be used for synchronisation purposes, may be determined by summing signal samples from each antenna element (ANT 1, ANT 2, . . . , ANT N) to average signal to noise ratio in order to avoid the possibility of using the signal from the antenna element with the worst signal to noise ratio. Alternatively, signal 1 may be selected to be the signal from the antenna element with the best signal to noise ratio. A further alternative is to initially use the sum of the signals over all antenna elements to determine a coarse synchronisation and after that synchronisation have been achieved and the signal to noise ratio for each antenna element have been estimated, the signal from the antenna having the best signal to noise ratio is used for synchronisation purposes.

Referring back to FIG. 6, the input samples x(i) of signal 1 are, according to this second embodiment of the present invention, coarse frequency adjusted in block 410 with a coarse frequency estimate value 411, and quantized to n-bit numbers in block 420 (and used as input to the crosscorrelator 430 (CC). It should be noted that in both the first and the second embodiments of the present invention, the input samples of signal 1 may be quantized first and then coarse frequency adjusted, i.e., in the first embodiment of the present invention, block 320 may be placed before block 310 or vice versa and in the second embodiment, block 420 may be placed before block 410 and vice versa. Referring back to FIG. 6, the crosscorrelator 430 (CC) crosscorrelates the input samples x(i) with complex conjugated quantized samples y(j) of a training sequence of the preamble 2 which may be a priori known to apparatus 400. According to the present invention, the preamble is quantized to m-bits, and i and j are time indexes. The purpose of the quantization is, as mentioned earlier, to reduce the computational complexity of apparatus 400.

Similarly to the previously described first exemplary embodiment of the present invention, the crosscorrelation metric |C(i)| may e.g. be estimated based on the first period of the preamble's long training sequence or may be estimated based on the input signal 1 and any predefined training preamble 2 quantized to m-bit numbers.

The crosscorrelation metric |C(i)| is also in this second embodiment estimated using equation (1) previously presented.

The output 3 of the crosscorrelator 430 (CC) i.e. the absolute value of the crosscorrelation metric |C(i)| is further used to estimate a signal power 4 $P_S(i)$ in a signal power estimator 440 (SPE) using previously presented equation (2). In this second exemplary embodiment of the present invention, the term of the average $N_S$ given in equation (2), may be chosen based on the system used and on the expected delay spread of the communication channel. $N_S$ is thus a design parameter.

Referring back to FIG. 6, apparatus 400 further comprises a noise floor power estimator 450 (NFPE) that receives as input the output 3 of the crosscorrelator 430 (CC) (i.e. |C(i)| and estimates a noise floor power 5 using a delayed long-term average (or moving average) on the output 3 of the crosscorrelator 430 (CC) (i.e. on |C(i)|. The estimate of the noise floor power 5 $P_{NF}(i)$ was previously given in equation (3).

As illustrated in FIG. 6, apparatus 400 further comprises, in accordance with embodiments of the present invention, means 460 (PNCCE) for estimating a power normalised crosscorrelation metric (PNCC metric) 6 as a function of the estimated signal power 4 and the noise floor power 5. Thus, similarly to the previously described first embodiment of the present invention, means 460 (PNCCE) receives as inputs the estimate of a signal power ($P_S(i)$) 4 and the estimate of a noise floor power ($P_{NF}(i)$) 5 and generates an estimate of a PNCC metric 6 using either previously described equation (4) or previously described equation (5). Thus means 460 (PNCCE) comprises similarly to the previously described first exemplary embodiment of the present invention, log block 461 (LOG) and log block 462 (LOG) and a combiner 463.

As shown in FIG. 6, apparatus 400 further comprises decision means 470 that is configured to decide that at least one time synchronisation event "Sync Event" occurs when at least one first synchronisation criterion CF1 is satisfied. The first synchronisation criterion CF1 corresponds to the PNCC metric 6 exceeding a predefined threshold value 9. Therefore, decision means 470 may comprise, as illustrated in FIG. 6, a comparator 471 (CMP) that receives the estimate of the PNCC metric 6 where it is compared with the threshold value 9. In case the PNCC metric 6 is estimated using equation (4) then the threshold value 9 is a logarithmic metric which may be chosen empirically based on e.g. Monte-Carlo simulations over a range of signal to noise ratios and communication channels.

It should be noted that by using equation (4) to determine PNCC metric 6 in logarithmic form, the computational complexity of apparatuses 300 (first embodiment) and 400 (second embodiment) is less than in the case equation (5) is used since equation (4) requires a logarithmic conversion and a subtraction operation to determine the PNCC metric 6 whereas equation (5) requires a division operation which is more computationally intensive.

Referring back to FIG. 6, the decision means 470 decides that the first synchronisation criterion CF1 is satisfied when the PNCC metric 6 exceeds threshold value 9 upon comparing in the comparator 471 the estimate of the PNCC metric 6 with the threshold value 9.

According to this second embodiment of the present invention, when decision means 470 declares that a time synchronisation event occurs, i.e. when the criterion function CF1 is satisfied, a magnitude value of the PNCC metric 6 and a corresponding time index or timing point are stored in a memory of the decision means 470. Similarly to the previously described first exemplary embodiment of the present invention, the synchronisation process does not stop immediately after the first "sync event" occurs but continues on until the training sequence has expired. Again, this is to minimize the probability of false alarm.

According to this second embodiment of the present invention, each stored magnitude value of the PNCC metric 6 and corresponding time index are further fed from comparator 471 (CMP) to a cluster analyser 491 (CA) of analysing means 490 (ANALYSER), also denoted here a post-processor. The analysing means 490 (ANALYSER) is configured to analyse stored time indexes and corresponding magnitude values of the PNCC metric 6 in order to synchronise timing using a timing synchronisation index $t_{index}$ that is based on stored time index/indexes.

According to this second embodiment of the present invention, the cluster analyser 491 (CA) of analysing means 490 (ANALYSER) analyses stored time indexes using a clustering approach which is described below.

The cluster analyser 491 (CA) of analysing means 490 (ANALYSER) is configured to group time indexes into clusters. According to this second exemplary embodiment of the present invention, a cluster includes stored PNCC magnitude values and corresponding stored time indexes with the distance of S sampling intervals between them, and where one cluster includes time indexes that are not further apart by more than Q sampling intervals, where Q is a natural number. When a cluster has been determined, the maximum PNCC magnitude value in this cluster may be calculated. With each new cluster identified, the distances between this new cluster and all previous clusters can be calculated.

According to an exemplary embodiment of the present invention, cluster distances maybe calculated (or determined) between the beginnings or endings of each cluster. According to another exemplary embodiment of the present invention, cluster distances maybe calculated (or determined) between time indexes corresponding to the maximum PNCC magnitude values of each cluster. According to yet another exemplary embodiment of the present invention, cluster distances maybe calculated (or determined) between the middles of each cluster. In case no clusters are found, the timing synchronisation is considered failed and the burst detector is enabled. If only one cluster is found, the timing synchronisation index corresponding to a maximum PNCC magnitude value in this cluster is, according to an embodiment of the present invention, used to synchronise receiver timing to the transmitter timing. Alternatively, a timing point corresponding to midpoint of the cluster may be used as a timing synchronisation index $t_{index}$ or a timing point corresponding to the beginning or ending of the cluster may used to as a timing synchronisation index.

According to another embodiment of the present invention, if more that one cluster is found, a timing synchronisation index $t_{index}$ used to synchronise receiver timing to transmitter timing is determined based on cluster distances that corresponds to the period of the training sequence (or the period of the training preamble) plus/minus some predefined constant, which may be determined based a channel delay spread of the communication system under consideration, or may be based on any other characteristic(s) of the communication system under consideration. However, the predefined constant may be omitted since this is a design choice.

It should be noted that if there are two or more cluster distances satisfying the synchronisation criterion of being equal to the period of the training sequence (or preamble) plus/minus the constant (optional), the distance between the clusters having the highest aggregate maximum PNCC magnitude values is used to determine or establish the timing synchronisation index $t_{index}$.

Figure 7:
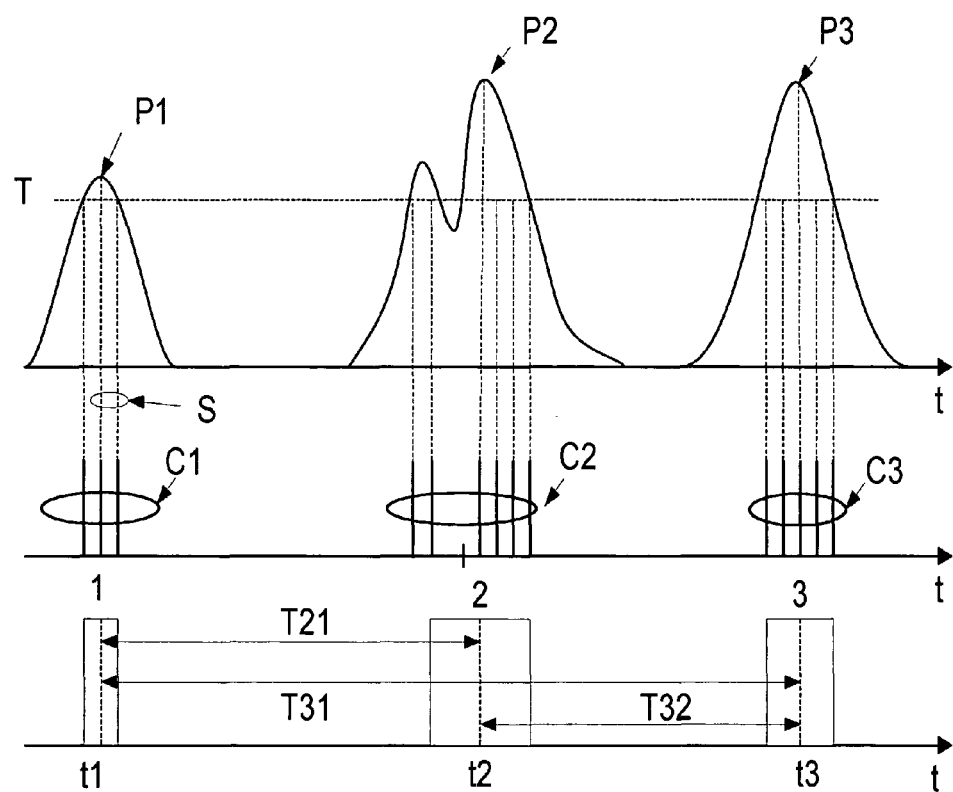
FIG. 7 illustrates an example of a clustering approach used in conjunction with the second exemplary embodiment of the present invention.

FIG. 7 illustrates an example of the clustering approach described above wherein three clusters C1, C2, C3 have been determined. The predetermined number S of sampling intervals in also indicated in FIG. 7. Assume that T21 (=t2−t1) is a distance between two clusters C1 and C2 wherein t1 is the timing index corresponding to the maximum PNCC magnitude value P1 of C1 and t2 is the timing index corresponding to the maximum PNCC magnitude value P2 of C2. A threshold T corresponding to the predefined threshold 9 shown in FIG. 6 is also illustrated in FIG. 7. Furthermore, assume that T32 (=t3−t2) is a distance between C3 and C2 wherein t3 is the timing index corresponding to maximum PNCC magnitude value P3 of C3. Then according to an exemplary embodiment of the present invention, a timing synchronisation index may be established as T32 (or T21) if P2+P3 (or P1+P2) is higher that P1+P2 (or P2+P3). In FIG. 7 it can be seen that T32 should be selected to be the cluster distance used to establish the timing synchronisation index $t_{index}$ since T32 corresponds to the highest aggregate of PNCC magnitude values (P2+P3).

Figure 8:
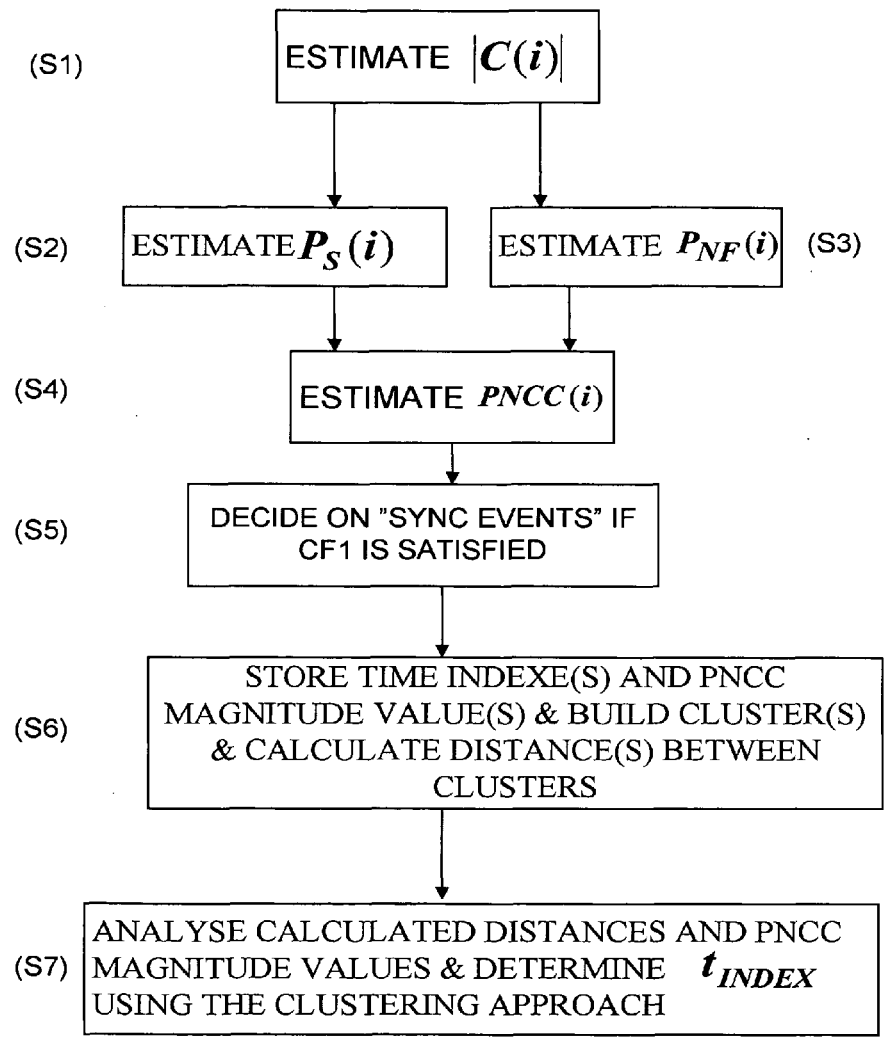
FIG. 8 is illustrates a flowchart of a method in accordance with the second exemplary embodiment of the present invention.

Referring to FIG. 8 there is illustrates a flowchart of a method in accordance with the above described second exemplary embodiment of the present invention for synchronising a receiver timing to a transmitter timing using a known preamble of a signal 1, said preamble comprises at least one training sequence as previously described. The method comprising the steps of:

(S1) estimating an absolute value of a crosscorrelation metric |C(i)| based on input samples of the signal (1) and samples of a training sequence of the preamble. |C(i)| is given by equation (1) presented earlier;

(S2) estimating a signal power $P_S(i)$ using a short-term average (or moving average) of |C(i)|. $P_S(i)$ is given by equation (2) presented earlier;

(S3) estimating a noise floor power $P_{NF}(i)$ using a delayed long-term average (or moving average) of |C(i)|. $P_{NF}$ is given by equation (3) presented earlier;

(S4) estimating a power normalized crosscorrelation metric PNCC(i) as a function of $P_S(i)$ $P_{NF}(i)$. PNCC(i) is given by equation (4) or equation (5) as presented earlier;

(S5) deciding, until the training sequence expires, that at least one synchronisation event "Sync Event" occurs when a first crosscorrelation metric CF1 is satisfied i.e. when the PNCC(i) exceeds a predetermined threshold level;

(S6) store, for each time a "Sync Event" occurs, a magnitude value of PNCC(i) and a corresponding time index and build at least one cluster by grouping stored time indexes and corresponding PNCC magnitude metric values into at least one cluster wherein time indexes in each cluster are further apart by a predetermined number of sampling intervals and determine for each cluster, a maximum PNCC magnitude value and further determine/calculate distances between clusters;

(S7) analyse calculated distances and corresponding magnitude values of the PNCC metric using the above described clustering approach in order to determine a timing synchronisation index $t_{index}$ used to synchronise timing in the receiver to timing in the transmitter. The timing synchronisation index $t_{index}$ is thus used to determine the beginning of the training sequence and/or the data of the input signal.

Figure 9:
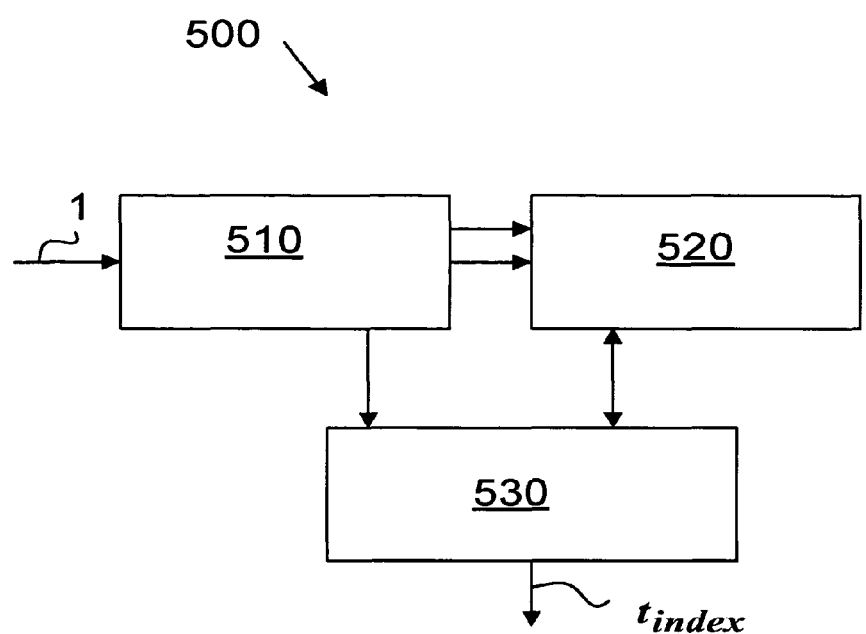
FIG. 9 illustrates an exemplary apparatus that covers an apparatus according to the first exemplary embodiment of the present invention and an apparatus according to the second exemplary embodiment of the present invention.

Referring to FIG. 9, there is illustrated an apparatus 500 according to an exemplary embodiment of the present invention. Apparatus 500 is a general concept of the present invention covering both the first exemplary embodiment of the present invention and the second exemplary embodiment of the present invention, both previously described in conjunction with FIG. 3 respectively FIG. 6.

As illustrated in FIG. 9, apparatus 500 comprises at least means 510 for estimating a power normalised crosscorrelation metric (PNCC) as a function of an estimated signal power and an estimated noise floor power. The signal power and the noise floor power are both estimated using an estimate of an absolute value of a crosscorrelation metric based on input samples of an input signal 1 (coarse frequency adjusted and quantized) and samples of a training sequence of a preamble (quantized). Means 510 thus comprises a crosscorrelator, a power signal estimator and noise floor power estimator. Apparatus 500 further comprises decision means 520 that is configured to decide that at least one synchronisation event occurs when at least one synchronisation criterion is satisfied corresponding to the estimated PNCC metric exceeding a threshold value and further configured to store, for each time a synchronisation event occurs, a magnitude value of the PNCC metric and a corresponding time index. Apparatus further comprises analysing (post-processing) means 530 for analysing stored time indexes and corresponding magnitude values of the PNCC metric to synchronise timing in a receiver timing to a transmitter timing using a timing synchronisation index $t_{index}$ that is based on at least one stored time index/indexes.

It should be noted that in case apparatus 500 is configured to synchronise timing in accordance with the first exemplary embodiment of the present invention, means 510 of apparatus 500 further comprises a peak detector to determine if a second criterion function is satisfied which is when at least one peak of the estimated absolute value the crosscorrelation metric is detected within a predetermined time window. In such case, decision means 520 decides that at least one synchronisation event occurs if both the first synchronisation criterion and the second criterion function are satisfied. As described earlier in relation to the first exemplary embodiment of the present invention, analysing means 530 may further comprise a filter synchroniser and a power synchroniser. The power synchroniser being connected to means 510 as illustrated in FIG. 9 (the arrow connecting means 510 and analysing means 520). The functions of the filter synchroniser and the functions of the power synchroniser have already been discussed earlier in conjunction with FIG. 3.

It should also be noted that in case apparatus 500 is configured to synchronise timing in accordance with the second exemplary embodiment of the present invention, analysing means 530 of apparatus 500 further comprises a cluster analyser for determining a timing synchronisation index $t_{index}$ according to a clustering approach as previously described in conjunction with FIG. 6.

Note also that apparatus 500 in accordance with embodiments of the present invention is suitable to be implemented in a SISO communication antenna system and/or a MIMO communication antenna system. Also, various aspects of the present invention may be employed as part of a wireless and/or a wired communication scheme.

A person skilled in the art appreciates that the present invention can be realised in many ways. The apparatus (es) can be realised in hardware with means of digital circuits or as software in a signal processing circuit. Furthermore, the different blocks of apparatus 500 in accordance with the embodiments of the present invention need not be separated but may be included in a single block and may also be connected to other means.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention

The invention claimed is:

1. A method for synchronising a receiver timing to a transmitter timing using a known preamble of a signal, the preamble comprising at least one training sequence, said method comprising:

estimating an absolute value of a cross-correlation metric based on input samples of said signal and samples of said training sequence of said preamble;

estimating a signal power using a short-term average of said estimated absolute value of said cross-correlation metric;

estimating a noise floor power using a delayed long-term average of said estimated absolute value of said cross-correlation metric;

estimating a power normalized cross-correlation metric (PNCC metric), as a function of said estimated signal power and said estimated noise floor power;

deciding that at least one time synchronisation event occurs when at least one first synchronisation criterion is satisfied corresponding to said PNCC metric exceeding a threshold value and storing, for each time a synchronisation event occurs, a magnitude value of said PNCC metric and a corresponding time index;

analysing said at least one stored time index and corresponding magnitude values of said PNCC metric to synchronise timing in said receiver to timing in said transmitter, using a timing synchronisation index that is based on at least said at lest one stored time index; and updating said threshold with a PNCC threshold value corresponding to the magnitude value of said PNCC metric for each time it is decided that a synchronisation event occurs.

2. The method according to claim 1 wherein said absolute value of said cross-correlation metric is estimated according to:

$$|C(i)| = \left| \sum_{j=0}^{L-1} y^*(j)x(i+j) \right|,$$

wherein C(i) is the estimated cross-correlation metric, x(i+j) are input samples of said signal; y(j) are samples of said training sequence; $0 < L \geq N_T$; $N_T$ is the length of said preamble; * is the complex conjugation operator; H is the absolute value operator and i=0, 1, . . . and j=0, . . . , L−1 are time indexes, wherein said signal power is estimated according to:

$$P_S(i) = MA_S(i) = \frac{1}{N_S} \sum_{j=0}^{N_S-1} |C(j+i)|,$$

wherein $MA_S$ is said short-term average of said absolute value of the cross-correlation metric, $N_s$ is the term of the average; i=0, 1, . . . and j=0, 1, . . . , $N_s$−1 are time indexes and wherein said noise floor power is estimated according to:

$$P_{NF}(i) = MA_L(i+D) = \frac{1}{N_L} \sum_{j=0}^{N_L-1} |C(j+i+D)|,$$

wherein $MA_L$ is said long-term average of said absolute value of the cross-correlation metric that is delayed with a delay D to align at least one peak of said short-term average with the floor of said long-term average $N_L$ is the long term of the average; i=0, 1, . . . and j=0, 1, - - -, $N_L$−1 are time indexes.

3. The method according to claim 1, wherein said power normalized cross-correlation metric, PNCC metric, is estimated according to:

PNCC(i)=log($P_S(i)$)−log($P_{NF}(i)$), wherein $P_S$ is said estimated signal power; $P_{NF}$ is said estimated noise floor power and log is a logarithm function of any base.

4. The method according to claim 1, wherein said power normalized cross-correlation metric, PNCC metric, is estimated according to:

$$PNCC(i) = \frac{P_S(i)}{P_{NF}(i)},$$

wherein $P_S$ is said estimated signal power and $P_{NF}$ is said estimated noise floor power.

5. The method according to claim 1, wherein the deciding further comprises deciding that said time synchronisation event occurs when both the first synchronisation criterion and a second synchronisation criterion corresponding to the absolute value of the cross-correlation metric exhibiting a peak within a given time window, are satisfied.

6. The method according to claim 1, further comprising increasing said threshold by a multiple of its current threshold value if a number of samples have elapsed since the last time synchronisation event has occurred.

7. The method according to claim 1, wherein the step of analysing further comprises grouping said stored time indexes and corresponding PNCC magnitude metric values into at least one cluster wherein time indexes in each of said at least one cluster are not further apart by more than a predetermined number of sampling intervals.

8. The method according to claim 7, wherein the grouping further comprises determining for each cluster a maximum PNCC magnitude value and determining distances between said clusters.

9. An apparatus for synchronising a receiver timing to a transmitter timing using a known preamble of a signal, said preamble comprising at least one training sequence, said apparatus comprising:
- a cross-correlator, configured to estimate an absolute value of a cross-correlation metric based on input samples of said signal and samples of said training sequence of said preamble;
- a signal power estimator, configured to estimate a signal power using a short-term average of said estimated absolute value of said cross-correlation metric;
- a noise floor power estimator, configured to estimate a noise floor power using a delayed long-term average of said estimated absolute value of said cross-correlation metric;
- device to estimate a power normalized cross-correlation metric (PNCC metric), as a function of said estimated signal power and said estimated noise floor power;
- decision device, configured to decide that at least one time synchronisation event occurs when at least one first synchronisation criterion is satisfied corresponding to said PNCC metric exceeding a threshold value and further configured to store, for each time a synchronisation event occurs, a magnitude value of said PNCC metric and a corresponding time index; and
- analysing device, configured to analyse said at least one stored time index and corresponding magnitude values of said PNCC metric to synchronise timing in said receiver to timing in said transmitter, using a timing synchronisation index that is based on at least said at least one stored time index;

wherein the apparatus is further configured to update said threshold value with a PNCC threshold value corresponding to the magnitude value of said PNCC metric for each time said decision device decides that a synchronisation event occurs.

10. The apparatus according to claim 9, wherein said cross-correlator is configured to estimate said absolute value of said cross-correlation metric according to:

$$|C(i)| = \left| \sum_{j=0}^{L-1} y^*(j)x(i+j) \right|,$$

wherein $C(i)$ is the estimated cross-correlation metric, $x(i+j)$ are input samples of said signal; $y(j)$ are samples of said training sequence; $0 < L \geq N_T$; NT is the length of said preamble; * is the complex conjugation operator; |.| is the absolute value operator and $i=0, 1, \ldots$ and $j=0, \ldots, L-1$ are time indexes, wherein said signal power estimator is configured to estimate said signal power according to:

$$P_S(i) = MA_S(i) = \frac{1}{N_S} \sum_{j=0}^{N_S-1} |C(j+i)|,$$

wherein $MA_S$ is said short-term average of said absolute value of the cross-correlation metric, N is the term of the average; $i=0, 1, \ldots$ and $j=0, 1, \ldots, N_s-1$ are time indexes and wherein said noise floor power estimator is configured to estimate said noise floor power according to:

$$P_{NF}(i) = MA_L(i+D) = \frac{1}{N_L} \sum_{j=0}^{N_L-1} |C(j+i+D)|,$$

wherein $MA_L$ is said long-term average of said absolute value of the cross-correlation metric that is delayed with a delay D to align at least one peak of said short-term average with the floor of said long-term average $N_L$ is the long term of the average; $i=0, 1, \ldots$ and $j=0, 1, \ldots, N_L-1$ are time indexes.

11. The apparatus according to claim 9, wherein said device to estimate said PNCC metric is configured to determine said PNCC metric according to:

PNCC($i$)=log($P_S(i)$)−log($P_{NF}(i)$)

wherein $P_S$ is said estimated signal power; $P_{NF}$ is said estimated noise floor power and log is a logarithm function of any base.

12. The apparatus according to claim 9, said device to estimate said PNCC metric is configured to determine said PNCC metric according to:

$$PNCC(i) = \frac{P_S(i)}{P_{NF}(i)},$$

wherein $P_S$ is said estimated signal power and $P_{NF}$ is said estimated noise floor power.

13. The apparatus according to claim 9, further comprising a peak detector, configured to detect when said absolute value of the cross-correlation metric exhibits a peak within a given time window.

14. The apparatus according to claim 13, wherein said decision device is further configured to decide that said time synchronisation event occurs when both said peak detector exhibits a peak within said given time window and said PNCC metric exceeds said threshold value.

15. The apparatus according to claim 9, further configured to increase said threshold value by a multiple of its current threshold value if a number of samples have elapsed since the last time synchronisation event has occurred.

16. The apparatus according to claim 9, wherein said analysing device is further configured to group said stored time indexes and corresponding PNCC magnitude metric values into at least one cluster wherein time indexes in each of said at least one cluster are further apart by a number of sampling intervals.

* * * * *